UNITED STATES PATENT OFFICE.

HENRY L. STAFFORD, OF LONG BEACH, CALIFORNIA.

PROCESS OF COOKING FISH AND OBTAINING FISH OILS AND JUICES THEREFROM.

1,201,522.  Specification of Letters Patent.  Patented Oct. 17, 1916.

No Drawing.  Application filed July 12, 1915.  Serial No. 39,455.

*To all whom it may concern:*

Be it known that I, HENRY L. STAFFORD, a citizen of the United States, residing at Long Beach, in the county of Los Angeles and State of California, have invented a new and useful Process of Cooking Fish and Obtaining Fish Oils and Juices Therefrom, of which the following is a specification.

Heretofore in cooking fish part of the fish oils and juices were lost, either by vaporization when cooking in open receptacles or by mingling with the water by which the fish are cooked in closed receptacles. The oils and juices lost in this way are rich in flavor and are extremely nutritious.

It is the primary object of my invention to provide a process for cooking fish and obtaining the true and unadulterated fish oils and juices in which a large amount of oils and juices are obtained without losing the desired rich oils and juices which are lost in cooking the fish in the ordinary way.

I have found that by suspending fish in a closed receptacle and subjecting the receptacle to external steam heat under pressure, the fish oils and juices will readily accumulate in the bottom of the receptacle and prove rich and delicate in flavor and the fish will be uniformly cooked as well. As the vapors rise from the fish they are confined to and collect upon the bottom of the receptacle. The oils and juices obtained in this way are the true unadulterated oils and juices of the fish and are desirable for chowder and the like.

In carrying out my process the fish are first cleaned and are then suspended in receptacles. The receptacles are then closed and placed in a steam retort or otherwise subjected to steam heat under pressure, the heat being externally applied to the receptacles so that none of the steam is permitted access to the receptacles and fish therein. The heat causes the fish to cook and the oils and juices to be exuded from the fish and collect in the bottom of the receptacle. The fish are suspended in such manner that they will cook uniformly and the juices will readily fall upon the bottoms of the receptacles and any suitable means may be employed for suspending fish in this manner. Were the fish allowed to come into contact with the oils and juices, much of the oils and juices would be absorbed. I have found that fish oils and juices obtained in this way are extremely rich in flavor, palatable and nutritious, and that this product may be used for various purposes, particularly in making chowder and the like. The fish are cooked uniformly and are tender, mealy and delicate in flavor.

I claim:

1. The process of obtaining true fish oils and juices which consists in first cleaning the fish, then suspending the fish in a closed receptacle spaced from the bottom walls thereof with the fish directly exposed to the walls of the receptacle, and then applying steam heat under pressure to the receptacle externally thereof whereby heat from the walls of the receptacle may be radiated directly upon the fish and the juices and oils of the fish will be exuded and collect upon the bottom of the receptacle.

2. The process of obtaining fish oils and juices in unadultered form which consists in first cleaning the fish, and then placing the fish in a closed externally heated receptacle in spaced relation to the bottom wall thereof with the fish directly exposed to the heat radiated from the walls of the receptacle whereby oils and juices will be exuded from the fish and collect upon the bottom of the receptacle.

In testimony whereof, I have hereunto set my hand at Los Angeles, California, this 7th day of July, 1915.

HENRY L. STAFFORD.

In presence of—
 CHAS. J. CHINN,
 L. BELLE WEAVER.

Copies of this patent may be obtained for five cents each, by addressing the "Commissioner of Patents, Washington, D. C."